(12) United States Patent
Ishizue et al.

(10) Patent No.: US 8,368,261 B2
(45) Date of Patent: Feb. 5, 2013

(54) MOTOR

(75) Inventors: Ikuhito Ishizue, Tokyo (JP); Takuhiro Kondo, Tokyo (JP); Naoto Natsume, Kosai (JP); Masayuki Echizen, Kosai (JP)

(73) Assignee: Kayaba Industry Co., Ltd, Tokyo (JP)

( * ) Notice: Subject to any disclaimer, the term of this patent is extended or adjusted under 35 U.S.C. 154(b) by 283 days.

(21) Appl. No.: 12/726,629

(22) Filed: Mar. 18, 2010

(65) Prior Publication Data

US 2010/0289354 A1  Nov. 18, 2010

(30) Foreign Application Priority Data

May 13, 2009  (JP) .................................. 2009-116461

(51) Int. Cl.
*H02K 1/04* (2006.01)
(52) U.S. Cl. .......................................... 310/43; 310/71
(58) Field of Classification Search .................... 310/71, 310/43, 87, 89
See application file for complete search history.

(56) References Cited

U.S. PATENT DOCUMENTS

| 6,166,143 | A  | * | 12/2000 | Watanabe et al. .............. 525/208 |
| 6,879,071 | B2 | * | 4/2005  | Kanazawa et al. ............... 310/71 |
| 7,084,547 | B2 | * | 8/2006  | Moroto et al. ................. 310/233 |
| 7,157,828 | B2 | * | 1/2007  | Moroto et al. ................ 310/261.1 |
| 2003/0230945 | A1 | * | 12/2003 | Okubo et al. .................. 310/112 |
| 2007/0103014 | A1 | * | 5/2007  | Sumiya et al. ................... 310/71 |

FOREIGN PATENT DOCUMENTS

| JP | 5-103439  |   | 4/1993 |
| JP | 2004-40852 |   | 2/2004 |
| JP | 2004-40853 | * | 2/2004 |

* cited by examiner

*Primary Examiner* — Nguyen N Hanh
(74) *Attorney, Agent, or Firm* — McGlew and Tuttle, P.C.

(57) ABSTRACT

The present invention provides a motor (M) including a rotor (1), a stator (S) having a winding wire (2) wound thereon, and an outer cylinder (3) for holding the stator (S) fitted into the inner circumference thereof. The stator (S), the outer cylinder (3), and a terminal (4) having one end (4a) connected to the winding wire (2) are integrated together by a mold resin (12) by insert molding while closing one end side of the outer cylinder (3) by the mold resin (12), and protruding the other end (4b) of the terminal (4) out of the motor (M) through the mold resin (12).

20 Claims, 1 Drawing Sheet

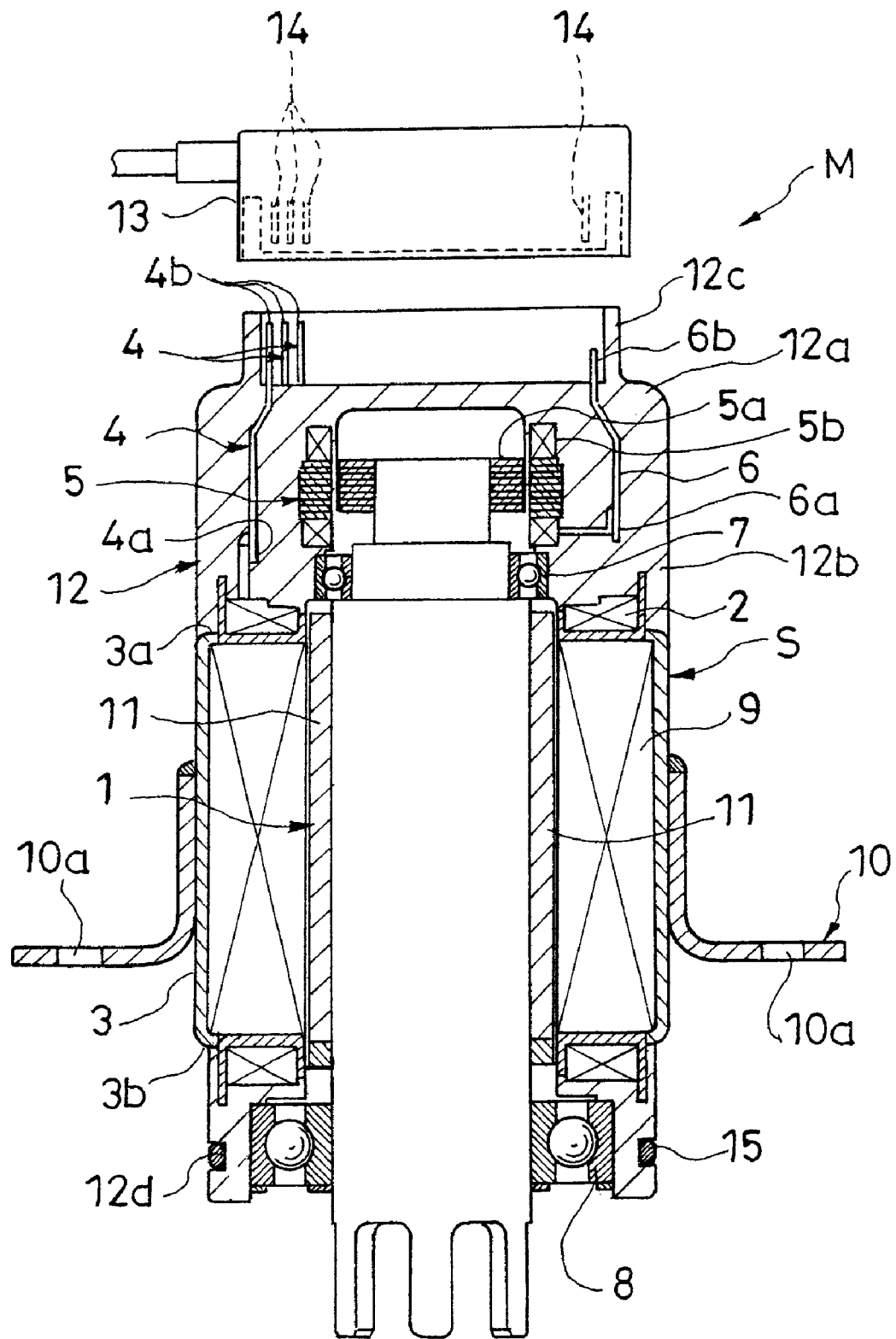

MOTOR

FIELD OF THE INVENTION

The present invention relates to improvements of a motor.

DESCRIPTION OF THE RELATED ART

Generally, a motor is adapted to be connectable to a power source set outside through a lead wire extending out of a case since it requires supply of current to a winding wire of an armature. Since such a motor involves the risk of penetration of water into the case through the circumference of the lead wire, for example, when applied to a device for outdoor use such as an automobile, a waterproof structure must be adopted for this portion to prevent the penetration of water to the inside, although the motor can be safely applied to a device free from internal penetration of water.

As a motor which achieved the waterproof structure, for example, a motor disclosed in Japanese Patent Application Laid-Open No. 2004-40852 comprises a cylindrical case storing an armature and a magnetic field, a rotor rotatably inserted into the case and protruded outward from one end thereof, and a cap fitted to an opening part at the other end of the case, in which the cap is made of resin and includes a through hole allowing insertion of a terminal for carrying current to the winding wire of the armature and a cylindrical connector which covers the outer circumference of the terminal protruded outwardly through the through hole.

The cap further holds a sensor for detecting a rotating position of the rotor, a sensor terminal connected to the sensor is embedded in the cap, and the outer circumference of the sensor terminal protruding outwardly is covered with a cylindrical sensor connector.

In the thus-constituted motor in which an external power source or a control device is connected to the winding wire and the sensor so that power feeding can be performed thereto by connecting a connector provided at the top end of a lead wire extended from the external power source or the like to the connector and the sensor connector provided on the cap, sure waterproofing can be achieved since the cap is fitted to the opening part of the motor to close it, as described above, the cap is provided with the connector and the sensor connector integrated by a mold resin, and the terminal and the sensor terminal are protruded respectively into the connector and into the sensor connector through the mold resin.

Further, a mold motor is also proposed, as disclosed in Japanese Patent Application Laid-Open No. Hei 5-103439, in which a case is formed by a mold resin with an armature insert-molded therein instead of the conventional case, and this mold motor also can achieve the internal waterproofing.

DISCLOSURE OF THE INVENTION

Although each motor disclosed in Japanese Patent Application Laid-Open No. 2004-40852 and Japanese Patent Application Laid-Open No. Hei 5-103439 is excellent in the point that it can be adapted to an automobile or the like since the penetration of water into the motor can be prevented, it has the following problems.

That is, in such a conventional motor, the sensor terminal is coated with a cord, the cord is not sealed to a conductor within the cord, and a clearance may be formed also between the cord and the mold resin without melting of the cord depending on the temperature or pressure in injection of the mold resin into a die or the difference in material between the cord and the cap made of resin. Therefore, the motor cannot be maintained in an internally airtight state, particularly, in a case such that the motor itself is used as a pressure vessel due to high internal pressure of a device to which the motor is installed, and the motor cannot be thus used for a purpose needing the internal air-tightness.

Further, such a conventional mold motor is not suitable for the use as pressure vessel, since the case formed by the mold resin is deformed, when high pressure acts on the inside of the motor, to cause change in characteristic of the motor, so that the motor cannot output an on-target torque.

In order to improve the above-mentioned problems, the present invention thus has an object to provide a motor which can maintain the inside in an airtight state with minimized change in characteristics even when high pressure acts on the inside thereof.

To attain the above-mentioned object, the present invention provides a motor, including a rotor, a stator having a winding wire wound thereon, and an outer cylinder for holding the stator fitted to the inner circumference thereof, in which the stator, the outer cylinder, and a terminal having one end connected to the winding wire are integrated together by a mold resin by insert molding while closing one end side of the outer cylinder by the resin, and protruding the other end of the terminal out of the motor through the mold resin.

According to the motor of the present invention, since the stator, the outer cylinder and the terminal are integrated together by the mold resin by insert molding, the inside of the motor can be held in an airtight state without leak of the pressure within the motor through the circumference of the stator, the outer cylinder and the terminal even when the motor is used as a pressure vessel.

The inside of the motor can be air-tightly closed without sealing the circumference of the terminal, and the number of part items can be thus reduced. Further, since the integration of the stator, the outer cylinder and the terminal into the mold resin by insert molding dispenses with the process of assembling each part to the case, reduction in workload can be attained as well as reduction in manufacturing cost.

Moreover, since the stator is held by the outer cylinder, and the deformation of the stator can be suppressed even if high pressure acts on the inside of the motor, the motor can be made to output an on-target torque while suppressing the change in characteristics of the motor. Accordingly, the motor can be used as a pressure vessel while ensuring the air-tightness.

Further, the terminal can be sealed without making the cross-sectional shape of the terminal into a circular shape since the integration of the terminal into the cap by insert molding dispenses with the sealing of the circumference of the terminal. Therefore, the flexibility of design of the terminal can be improved. For example, the space for the terminal within the case can be reduced by forming the terminal into a flat sheet shape, compared with a terminal having a circular sectional shape, and this is also contributable to the reduction in size of the motor.

BRIEF DESCRIPTION OF THE DRAWINGS

FIG. 1 is a vertical sectional view of a motor according to one embodiment of the present invention.

MODE FOR CARRYING OUT THE INVENTION

The present invention will be further described based on an embodiment shown in the drawing. As shown in FIG. 1, a motor M in one embodiment comprises a rotor 1; a stator S having a winding wire 2 wound thereon; an outer cylinder 3 for holding the stator S fitted to the inner circumference thereof; a terminal 4 having one end connected to the winding wire 2; a sensor 5 for detecting a rotating position of the rotor 1; and a sensor terminal 6 having one end connected to the sensor 5, in which the stator S, the outer cylinder 3, the terminal 5 and the sensor terminal 6 are integrated into a mold resin 12 by insert molding, and the upper end side in FIG. 1 that corresponds to one end side of the outer cylinder 3 is closed by the mold resin 12.

Each part will be then described in detail. The rotor 1 has a cylindrical shape, as shown in FIG. 1, includes a plurality of magnets 11 which forms a magnetic field on the outer circumference, and is pivoted at both ends by a pair of ball bearings 7 and 8 fitted to the inner circumference of the mold resin 12 molded into a topped cylindrical shape opened at the lower end so as to be rotatable relative to the stator S held by the mold resin 12.

The stator S includes a cylindrical core 9 provided with a plurality of slots and opposed to the outer circumference of the magnet 11 of the rotor 1; and the winding wire 2 wound on each slot of the core 9, and is fixed to the inner circumference of the cylindrical outer cylinder 3.

In detail, the outer cylinder 3 includes caulked parts 3a and 3b formed by caulking toward the inner circumferential side at upper and lower ends thereof, and holds the stator S in a stationary manner by holding the outer circumference at the upper and lower ends of the core 9 of the stator S fitted to the inside by the caulked parts 3a and 3b. Therefore, the outer cylinder 3 is axially longer than the stator S by the portion corresponding to the caulked parts 3a and 3b. In the fixation of the stator S to the outer cylinder 3, press fitting and other fixing methods can be adopted in addition to the above-mentioned caulking fixation.

An annular flange 10 is provided on the outer circumference of the outer cylinder 3. The flange 10 includes a plurality of bolt insert holes 10a, so that the motor M can be fixed to a motor setting place by screw fastening using the flange 10.

In this motor M, the stator S includes three-phase or U, V, and W-phase winding wires 2, and one terminal 4 is connected to each phase winding wire 2 so that the winding wire 2 is connected to the external power source through the corresponding terminal 4. That is, the motor M adapted so that power feeding can be performed to the winding wire 2 through the terminal 4 is constituted, for example, as a conventionally known three-phase brushless motor in which the stator that is an armature generates a rotary magnetic field by applying a sine wave voltage to three-phase or U, V and W-phase winding wires with a phase difference of 120°, and the magnet 11 that forms the magnetic field rotationally drives the rotor 1 following it, and the terminal 4 is connected to the external power source through a motor driver circuit such as an inverter circuit for applying voltage to the winding wire 2 as described above.

In this embodiment, since the motor M constituted as the brushless motor requires detection of rotating position of the rotor 1 for controlling the current carrying to each winding wire 2, the motor M includes the sensor 5 for detecting the rotating position. The sensor 5 is concretely composed of a resolver, including a resolver rotor 5a installed to the outer circumference at the upper end in FIG. 1 of the rotor 1, and a resolver stator 5b integrated into the mold resin 12 and opposed to the resolver rotor 5a.

The motor further comprises the sensor terminal 6 for carrying a current to the resolver stator 5b of the sensor 5 and taking out an output signal to the outside, and the resolver stator 5b is connected to the external power source and a controller out of the drawing which receives the output signal through the sensor terminal 6. The controller obtains the position of the rotor 1 from the output of the sensor 5, and controls the motor driver circuit to properly perform rotary drive of the motor M.

The mold resin 12 is molded into a topped cylindrical shape including a top part 12a and a cylindrical part 12b by use of a die, and closes the upper end of the outer cylinder 3, and ball bearings 7 and 8 rotatably supporting both ends of the rotor 1 are fitted to the inner circumference of the cylindrical part 12b.

The stator S, the outer cylinder 3, the resolver stator 5b, the terminal 4 and the sensor terminal 6 are integrated into the mold resin 12. The mold resin 12 fits into the slots of the core 9 of the stator S to enclose the stator S, and covers also the outer circumference of the resolver stator 5b to enclose the resolver stator 5b.

Further, the terminal 4 is embedded in the mold resin 12 in a bar-form, and covered with and enclosed in the mold resin 12 with one end 4a thereof being connected to the winding wire 2, and the other end 4b thereof is protruded out of the motor from the top part 12a located above in FIG. 1 of the mold resin 12. The sensor terminal 6 is also embedded in the mold resin 12 in a bar-like form, and covered with and enclosed in the mold resin 12 with one end 6a thereof being connected to the resolver stator 5b, and the other end 6b thereof is protruded out of the motor from the top part 12a located on the upper side in FIG. 1 of the mold resin 12.

A cylindrical connector 12c is formed on the outer circumference at the upper end in FIG. 1 that corresponds to the motor outer side of the top part 12a of the mold resin 12, so that the connector 12c can be connected to a connector 13 provided at the top end of a lead wire extended from the external power source and the controller out of the drawing. Therefore, by mutually connecting the connectors 12c and 13, the other ends 4a and 6a of the terminal 4 and the sensor terminal 6 can be maintained in a state in which they are connected to a power source-side terminal 14 which is connected to the external power source or the like and contained in the connector 13.

An annular groove 12d is provided on the outer circumference at the lower end in FIG. 1 of the cylindrical part 12b of the mold resin 12, and a seal ring 15 is installed into the annular groove 12d. Thus, by inserting the lower end of the cylindrical part 12b of the mold resin 12 into a device which requires the power of the motor M, a space between the device and the motor M is air-tightly sealed.

In this way, the stator S, the outer cylinder 3, the resolver stator 5b, the terminal 4 and the sensor terminal 6 are integrated into the mold resin 12 by insert molding. For details, the integration is performed by insert molding of preliminarily inserting the stator S, the outer cylinder 3 holding the stator, the resolver stator 5b, the terminal 4 and the sensor terminal 6 into a die for molding the mold resin 12 and injecting the heated and pressurized mold resin 12 into the die. According to this, since the outer circumference of the stator S, the resolver stator 5b, the terminal 4 and the sensor terminal 6 is surrounded by the mold resin 12 with no space between these members and the mold resin 12, the inside of the mold resin 12 after molding, or the inside of the motor M, can be held in an airtight state.

When a thermoplastic resin is used as the mold resin 12 with an oxygenated hydrocarbon resin being mixed thereto, and the melted mold resin 12 is brought into contact with a metallic product, the metal can be adhered to the mold resin 12, and the air-tightness can be improved using this adhesive effect. That is, the thermoplastic resin with the oxygenated hydrocarbon resin being mixed thereto is used as the mold resin 12 to adhere the metal to the mold resin 12 by performing the insert molding of inserting the metallic terminal 4 and the sensor terminal 6 into the die and injecting the melted thermoplastic resin into the die, whereby the air-tightness within the motor M can be improved without peeling of the metal from the mold resin 12.

The adhesion between the metal and the mold resin 12 can be more strengthened by surface-treating the terminal 4 and the sensor terminal 6 which are made of metal with a triazine thiol compound prior to the insert molding, whereby the air-tightness within the motor M can be further improved. In this case, a resin other than the thermoplastic resin may be used.

The selection of the thermoplastic resin and the oxygenated hydrocarbon resin to be mixed thereto, the procedure for the surface treatment of metal with the triazine thiol compound, or the like can be performed according to a method and a procedure described, for example, in Japanese Patent Application Laid-Open No. Hei 11-58604 and Japanese Patent Application Laid-Open No. 2001-1445.

Consequently, since the stator S, the outer cylinder 3, the resolver stator 5b, the terminal 4 and the sensor terminal 6 are integrated together by the mold resin 12 by the insert molding, the inside of the motor M can be held in an airtight state, even when the motor M is used as a pressure vessel, without leak of the pressure within the motor through the circumference of the stator S, the outer cylinder 3, the resolver stator 5a, the terminal 4 and the sensor terminal 6.

Since the inside of the motor M can be air-tightly closed without sealing the circumference of the terminal 4 and the sensor terminal 6, the number of part items can be reduced. Further, since the stator S, the outer cylinder 3, the resolver stator 5b, the terminal 4 and the sensor terminal 6 are integrated into the mold resin 12 by the insert molding, the process of assembling each part to the case can be omitted, and reduction in workload can be attained as well as reduction in manufacturing cost.

Further, since the stator S is held by the outer cylinder 3 so that the deformation of the stator S can be suppressed even when high pressure acts on the inside of the motor M, the change in characteristics of the motor can be suppressed to make the motor M output an on-target torque. Therefore, the motor M can be used as a pressure vessel while ensuring the air-tightness.

Additionally, since the flange 10 for fixing the motor is provided on the outer circumference of the outer cylinder 3, a torque as a retroaction in the torque output by the motor M can be received by the outer cylinder 3 and the flange 10 so as not to act on the mold resin 12.

Further, since the sealing of the circumference of the terminal 4 and the sensor terminal 6 is dispensed with, the terminal 4 and the sensor terminal 6 can be sealed without making the cross-sectional shape thereof into a circular shape. Therefore, the flexibility of design of the terminal 4 and the sensor terminal 6 can be improved. For example, the space for the terminal 4 and the sensor terminal 6 within the case 1 can be reduced by forming the terminal 4 and the sensor terminal 6 into a flat sheet shape, compared with those having a circular sectional shape, and this is also contributable to the reduction in size of the motor M.

Although the three-phase brushless motor having three terminals 4 protruded out of the case 1 is adapted in this embodiment, the number of terminals may be set to a necessary number according to the number of corresponding winding wires. Further, although the resolver is used as the sensor 5 for detecting the position of the rotor 1, another sensor such as a Hall element may be used, and when the motor M is a motor with brush which does not require setting of the sensor, only the terminal 4 for current-carrying to the winding wire 2 can be integrated into the cap 6 by insert molding.

Further, although the terminal 4 protruded out of the case 1 and the sensor terminal 6 connected to the sensor 5 are protruded into the single connector 12c, connectors for power source and for sensor may be separately provided, and the shape of the connector 12c is never limited by that shown in the drawing.

It is obvious that the scope of the present invention is never limited by details shown by the drawings or described themselves.

INDUSTRIAL AVAILABILITY

The present invention can be applied to a motor.

The invention claimed is:

1. A motor, comprising:
 a rotor;
 a stator having a winding wire wound thereon;
 a sensor for detecting a rotating position of said rotor, said sensor comprising a resolver rotor and a resolver stator, said resolver rotor engaging at least an outer circumferential portion of said rotor; and
 an outer cylinder for holding the stator fitted to an inner circumference thereof, wherein the stator, the outer cylinder, and a terminal having one end connected to the winding wire are integrated together by a mold resin by insert molding while closing one end side of the outer cylinder by the mold resin, and protruding another end of the terminal out of the motor through the mold resin, said resolver stator engaging said mold resin.

2. The motor according to claim 1, wherein a connector which maintains the terminal in a state in which the terminal is connected to a power source-side terminal connected to an external power source is provided on the mold resin.

3. The motor according to claim 2, further comprising:
 a sensor terminal having one end connected to the sensor, said sensor terminal being integrated into the mold resin, and another end of the sensor terminal protruding out of the motor through the mold resin.

4. The motor according to claim 3, wherein the connector maintains the sensor terminal in a state in which said sensor terminal is connected to the power source-side terminal connected to the external power source.

5. The motor according to claim 3, wherein said rotor comprises a longitudinal axis, said sensor terminal being located on one side of said longitudinal axis, said terminal being located on another side of said longitudinal axis, wherein said sensor terminal is radially opposite said terminal with respect to said longitudinal axis.

6. The motor according to claim 3, further comprising:
 a cap structure comprising a mold resin connector receiving recess, a first cap terminal and a second cap terminal, said mold resin comprising a mold resin connector portion, said mold resin connector receiving recess receiving at least a portion of said mold resin connector portion, wherein said mold resin connector portion engages said cap structure, said first cap terminal and said second cap terminal being connected to a power source, said sensor terminal engaging said second cap terminal, said terminal engaging said first cap terminal.

7. The motor according to claim 6, wherein said another end of said sensor terminal and said another end of said terminal have a height that is less than a height of said mold resin connector portion.

8. The motor according to claim 1, wherein the mold resin holds a pair of ball bearings rotatably supporting both ends of the rotor, at least a portion of one of said pair of ball bearings engaging said mold resin.

9. The motor according to claim 8, wherein said resolver stator is located at a position above said one of said bearing pair of ball bearings.

10. The motor according to claim 1, wherein a flange for fixing the motor is provided on the outer circumference of the outer cylinder.

11. The motor according to claim 1, wherein the terminal is surface-treated with a triazine thiol compound, and then integrated into the mold resin by insert molding.

12. The motor according to claim 1, further comprising:
an annular flange connected to said outer cylinder, said annular flange comprising one or more recesses, said annular flange being arranged opposite said stator.

13. A motor, comprising:
a rotor comprising an upper end portion;
a stator having a winding wire wound thereon;
an outer cylinder comprising an inner surface, said stator engaging said inner surface;
a first connector having a first end and a second end, said first end being connected to said winding wire;
a bearing structure engaging said upper end portion, said bearing structure comprising an outer side surface and an outer upper surface;
a mold resin structure, said stator, said outer cylinder and said first end being connected to one another via said mold resin structure, said mold resin structure sealing one end of said outer cylinder, said second end being located at a spaced location from an outer surface of said mold resin structure, said first end, said stator and said outer cylinder engaging said mold resin structure, at least a portion of said outer side surface and said outer upper surface engaging said mold resin structure.

14. The motor according to claim 13, further comprising:
a sensor for detecting a rotating position of said rotor, said sensor comprising a resolver rotor and a resolver stator, said resolver rotor engaging at least an outer circumferential portion of said rotor, said resolver stator comprising an outer side resolver stator surface, an upper outer side resolver stator surface and a lower outer side resolver stator surface, said mold resin structure engaging at least a portion of said upper outer side resolver stator surface, said lower outer side resolver stator surface and said outer side resolver stator surface.

15. The motor according to claim 14, further comprising:
a second connector comprising a second connector first end and a second connector second end, said second connector first end being connected to said sensor, at least said second connector first end engaging said mold resin structure;
a cap structure comprising a mold resin connector receiving recess, a first cap terminal and a second cap terminal, said mold resin structure comprising a mold resin connector portion at one end thereof, said mold resin connector receiving recess receiving at least a portion of said mold resin connector portion, wherein said mold resin connector portion engages said cap structure, said first cap terminal and said second cap terminal being connected to a power source, said second connector second end engaging said second cap terminal, said second end of said first connector engaging said first cap terminal.

16. The motor according to claim 15, wherein said second end of said first connector and said second connector second end of said second connector have a height that is less than a height of said mold resin connector portion.

17. The motor according to claim 14, wherein said resolver stator is located at a position above said bearing structure.

18. A motor, comprising:
a rotor;
a stator having a winding wire wound thereon;
an outer cylinder comprising an inner surface, said stator engaging said inner surface;
a first connector having a first end and a second end, said first end being connected to said winding wire;
a sensor for detecting a rotating position of said rotor, said sensor comprising a sensor side surface, a sensor upper surface and a sensor lower surface;
a mold resin structure, said stator, said outer cylinder and said first end being connected to one another via said mold resin structure, said mold resin structure sealing one end of said outer cylinder, said second end being located at a spaced location from an outer surface of said mold resin structure, said first end, said stator and said outer cylinder engaging said mold resin structure, said sensor side surface, said sensor upper surface and said sensor lower surface engaging said mold resin structure.

19. The motor according to claim 18, further comprising:
a bearing structure, said rotor comprising an upper end portion, said bearing structure engaging said upper end portion, said bearing structure comprising an outer bearing structure side surface and an outer upper bearing structure surface, at least a portion of said outer bearing structure side surface and said outer upper bearing structure surface engaging said mold resin structure;
a second connector comprising a second connector first end and a second connector second end, said second connector first end being connected to said sensor, at least said second connector first end engaging said mold resin structure;
a cap structure comprising a mold resin connector receiving recess, a first cap terminal and a second cap terminal, said mold resin structure comprising a mold resin connector portion, said mold resin connector receiving recess receiving at least a portion of said mold resin connector portion, wherein said mold resin connector portion engages said cap structure, said first cap terminal and said second cap terminal being connected to a power source, said second connector second end engaging said second cap terminal, said second end of said first connector engaging said first cap terminal.

20. The motor according to claim 19, wherein said sensor comprises a resolver rotor and a resolver stator, said resolver rotor engaging at least an outer circumferential portion of said rotor, said resolver stator comprising said sensor side surface, said sensor upper surface and said sensor lower surface, wherein said second end of said first connector and said second connector second end of said second connector have a height that is less than a height of said mold resin connector portion, said resolver stator being located at a position above said bearing structure.

* * * * *